United States Patent
Auracher et al.

(10) Patent No.: US 6,550,127 B1
(45) Date of Patent: Apr. 22, 2003

(54) DEVICE FOR HOLDING A PART AND APPLICATION OF THE DEVICE

(75) Inventors: Franz Auracher, Baierbrunn (DE); Julius Wittmann, Oberhaching (DE)

(73) Assignee: Infineon Technologies Aktiengesellschaft, München (DE)

( * ) Notice: Subject to any disclaimer, the term of this patent is extended or adjusted under 35 U.S.C. 154(b) by 0 days.

(21) Appl. No.: 09/527,900

(22) Filed: Mar. 20, 2000

(30) Foreign Application Priority Data

Mar. 19, 1999 (DE) .......................... 199 12 424

(51) Int. Cl.⁷ ........................ B23Q 3/00; B25B 11/00
(52) U.S. Cl. ........................ 29/464; 29/468; 29/559; 269/20; 269/21
(58) Field of Search .................... 29/464, 468, 559; 269/20, 21

(56) References Cited

U.S. PATENT DOCUMENTS

| | | | |
|---|---|---|---|
| 2,695,199 A | | 11/1954 | Blizard |
| 4,469,929 A | * | 9/1984 | Rosen et al. ........... 219/121.64 |
| 4,491,306 A | | 1/1985 | Eickhorst |
| 4,654,505 A | * | 3/1987 | Sciaky et al. .......... 219/121.63 |
| 4,798,478 A | | 1/1989 | Crystal |
| 5,056,765 A | * | 10/1991 | Brandstater .................. 269/20 |
| 5,196,875 A | * | 3/1993 | Stuckler .................... 353/122 |
| 5,501,114 A | * | 3/1996 | Okamoto et al. .......... 73/865.6 |
| 5,743,731 A | * | 4/1998 | Lares et al. .................... 433/29 |
| 5,782,572 A | * | 7/1998 | Thiem .................... 248/288.31 |
| 5,812,717 A | * | 9/1998 | Gilliland ........................ 385/88 |
| 5,821,981 A | * | 10/1998 | Menard et al. .............. 347/129 |
| 6,012,711 A | * | 1/2000 | Cipolla .......................... 269/20 |
| 6,071,017 A | * | 6/2000 | Gilliland et al. .............. 385/88 |
| 6,454,333 B2 | * | 9/2002 | Portal ........................ 294/64.1 |
| 6,502,808 B1 | * | 1/2003 | Stone et al. ................... 269/21 |

FOREIGN PATENT DOCUMENTS

| | | |
|---|---|---|
| CA | 1 182 489 | 2/1985 |
| DE | 32 07 013 | 9/1983 |
| DE | 39 30 629 | 3/1991 |
| DE | 195 00 613 | 7/1995 |
| DE | 196 02 636 | 7/1997 |
| DE | 196 04 001 | 8/1997 |
| GB | 2 176 546 | 12/1986 |

* cited by examiner

Primary Examiner—Gregory Vidovich
Assistant Examiner—Essama Omgba
(74) Attorney, Agent, or Firm—Schiff Hardin & Waite

(57) ABSTRACT

A device for holding a part comprises a retainer member provided for applying and holding the part and having a convexly spherical surface section which is received in a concavely spherical surface section of a receptacle member. To enable movement of the spherical surface sections relative to one another, the device includes an arrangement for forming a temporary friction-free air bearing between the two surface sections, which can be removed once the surfaces of the two parts have been brought into the desired alignment and engagement to fix the receptacle and retainer members in position.

15 Claims, 4 Drawing Sheets

DEVICE FOR HOLDING A PART AND APPLICATION OF THE DEVICE

BACKGROUND OF THE INVENTION

The present invention is directed to a device for holding a part, which has a retainer member received in a receptacle member. The retainer member is provided for applying and holding the part and has a convexly spherical surface section and a surface section for the application of the part to be held, while the receptacle member provides a rotatable seating for the retainer member and comprises a concavely spherical surface forming al sliding seating surface for the convexly spherical surface section of the retainer member.

A device of this type is disclosed in German 196 02 636. The problem of plane-parallel alignment and adjustment of the two parts respectively comprising a planar surface section can be solved with such a device. This problem particularly occurs when the parts are to be permanently connected to one another after the adjustment, for example with laser welding, soldering or gluing.

For laser welding given the device disclosed by the German document, a laser beam serving this purpose can be supplied to the weld location for attachment of the part to be held unimpeded by the receptacle, the retainer member and the surface section as a result of a recess fashioned in the retainer member and the receptacle member.

When the surface sections of the parts to be connected to one another that face toward one another are aligned plane-parallel, a wedge-shaped gap, for example between these surface sections, leads to a warping when a weld or a solder hardens or when an adhesive cures. This warping generally modifies the relative position of the parts connected to one another in an unfavorable way.

An automatic, plane-parallel alignment is achieved with a device of this type in that one part is held on a rotatably seated retainer member of the device while the other part is firmly held outside the device.

For automatic alignment of the parts, the planar surface section of the part held on the retainer member and the planar surface section of the part firmly held outside the device are placed into contact with one another under a slight pressure.

Given proper dimensioning of the device, the two parts are aligned such that their planar surface sections facing toward one another are aligned plane-parallel relative to one another.

According to the above-mentioned German document, it is necessary for this purpose that the tilting or alignment moment generated by the pressing power is greater than the frictional moment of the convexly spherical surface section of the retainer member on the concavely spherical surface section of the receptacle member of the device forming the glide surface. With a given geometry of the device, the automatic alignment can only occur up to a maximum coefficient of friction and, thus, frictional moment as well.

SUMMARY OF THE INVENTION

The invention is based on the object of offering a device for holding a part for an automatic alignment of this part that produces an automatic alignment largely independently of the dimensioning and/or geometry of the device, even given slight pressing power.

According to the solution of the present invention, the inventive device comprises the features of an improvement in a device having a retainer member received in a receptacle member with the retainer member having a convexly spherical surface section and a surface section for applying the part to be held and the receptacle member providing a rotatable bearing for the retainer member, said rotatable bearing being a concavely spherical surface forming a glide seat surface for the convexly spherical surface section of the retainer member. The improvement comprises a glide means for arrangement between the concavely spherical surface section of the receptacle member and the convexly spherical surface section of the retainer member of the device, which accepts this section, the glide means being in the form of a glide layer.

As a result of the glide layer arranged between the concavely spherical surface section of the receptacle member and the convexly spherical surface section of the retainer member accepted in this section, the coefficient of friction between these two sections can be advantageously kept so slight that the dimensions and geometry of the device no longer have any influence on the pressing power or pressure needed for the alignment, and this pressing power can be extremely low.

A preferred and advantageous development of the inventive device comprises a means for at least temporarily producing the glide layer composed of the glide means between the concavely spherical surface section of the receptacle member and the convexly spherical surface section of the retainer member accepted therein.

In this case, one can advantageously proceed so that the glide layer is produced during the alignment event in order to keep the friction between the retainer member and the receptacle member as low as possible. After self-alignment has occurred, the glide layer can be eliminated for a secure fixing of the alignment and, thus, this friction can be, in turn, increased.

This can be especially simply implemented when the glide means is a gas, for example air.

In this case, it is advantageous in view of a simple structure when the means for producing the glide layer of the gas comprises at least one inflow opening fashioned in one of the two spherical surface sections, preferably an inflow opening fashioned in the surface section of the receptacle member for allowing a gas to flow in under pressure into the interspace between the two spherical surface sections.

The means for producing the glide layer of the gas can thereby comprise an optionally actuatable means for producing a gas under pressure, preferably arranged outside the retainer member and the receptacle member. This means is connected to the inflow opening, preferably by a channel fashioned in the receptacle member and leading to the inflow opening and a pressure conduit, which connects the channel to the means.

An air bearing of the retainer member, which advantageously enables a practically friction-free and, thus, resistance-free turning of the retainer member in all directions around a center of a sphere of the convexly spherical surface section, is realized by the glide layer of the pressurized gas formed between the convexly spherical surface section of the retainer member and the concavely spherical surface section of the receptacle member.

A better fixing of the alignment following the alignment event can be advantageously achieved by means of a temporary producing of an under-pressure between the two spherical surface sections for mutually pressing these two surface sections against one another. The retainer member and the receptacle member can thereby be advantageously firmly fixed relative to one another so that a modification of the alignment of the retainer member and, thus, of the part held on this member is practically only possible with the application of a force.

The means for temporarily producing an under-pressure between the two spherical surface sections can be constructed similar to a means for generating the pressure when the means for generating the under-pressure comprises at least one extraction opening formed in one of these two surface sections, preferably, the section of the receptacle member for removal of the gas in the interspace between the two spherical surface sections.

Similar to the means for generating the pressure, it is also advantageous here when the means for generating the under-pressure between the two spherical surface sections comprises an optionally actuatable means for generating the under-pressure, preferably arranged outside the retainer member and the receptacle member. The means is connected to an extraction opening, preferably by a channel fashioned in the receptacle member and leading to the extraction opening and an under-pressure conduit that connects the channel to this under-pressure generating means.

Advantageously, recesses are formed in the retainer member and the receptacle member, and the recesses allow at least two light beams directed onto the convexly spherical surface section in directions that are oblique relative to one another to emerge unimpeded through the receptacle and retainer member and from the surface section for application on the part to be held. When, in this case, laser beams for welding are employed as the light beams, two or more weld locations separate from one another can be simultaneously achieved. In this way, two parts to be aligned plane-parallel relative to one another and to be joined to one another can be simultaneously welded to one another at two or more separate points.

For holding a part on the device, a fastening tool for optionally releasable fastening of the part to be held on the retainer member is preferably secured on the retainer member.

Often, the part to be held is cylindrical, at least in sections thereof, and comprises a planar end face to be aligned plane-parallel with respect to another planar surface. In this case, the fastening tool is preferably a clamp tool having clamping jaws grouped around an axis and perpendicularly adjustable, for example adjustable radially relative to this axis, between which the part can be held with its cylindrical axis coaxially to the axis of the tool. The clamp tool is preferably secured on the retainer member so that the axis of the clamp tool coincides with an axis proceeding through the spherical center of the convexly spherical surface section of the retainer member.

For example, housings for holding optical lenses or fiber ends that are to be connected to optical transmitter modules via a planar end face of these modules are cylindrical, at least in sections. Given a housing for holding a fiber end, the fiber forming this end usually hangs from the housing in the form of a long fiber tail that, for example, can have a length of a few decimeters or more. This fiber tail can be a disturbing factor when fastening the housing to the retainer member.

This problem can be entirely or at least partially eliminated when a slot for the acceptance of the fiber is fashioned in the retainer member. The slot expediently extends in the direction of the cylindrical axis of the housing held on the retainer member, extending entirely through the retainer member in the direction perpendicular to this axis, but only partly, so that the retainer member remains together and does not fall apart. Since the retainer is arranged on the receptacle member and hardly any interspace is located between these members, it is expedient when a slot for the acceptance of the fiber is also fashioned in the receptacle member, and this slot is aligned with the slot of the retainer member.

An optional fastening and re-release of a part to be held in the fastening tool fastened on the retainer member can be advantageously achieved by a pneumatic means for an optional opening and closing of the fastening tool. Preferably and advantageously, such a means for optionally opening and closing the fastening tool is fashioned in the retainer member and is externally actuatable.

When, for example, the fastening tool is composed of a clamp tool having two or more adjustable clamping or clamp jaws, then the means arranged in the inside of the retainer member for optionally opening and closing the clamp tool can, per clamp jaw, comprise a respective hydraulic or, preferably, pneumatic cylinder and a force transmission means for the transmission of a piston force of the cylinder onto the clamp jaw for optionally opening said clamp jaw in the direction of a closing or opening of the clamp tool.

Each pneumatic cylinder is preferably connected, for example by a channel fashioned in the retainer member, to an inflow and outflow opening fashioned in the convexly spherical surface section of the retainer member. An inflow and outflow opening is arranged in the convexly spherical surface section of the receptacle member opposite the inflow and outflow opening, and the inflow and outflow opening is connected to a means preferably arranged outside the retainer and receptacle member for optionally generating a pressure and an under-pressure. Preferably, this means is connected by a channel formed in the receptacle member and leads to the inflow and outflow opening and by a pressure and under-pressure conduit connecting this channel to this means. The inflow and outflow opening fashioned in the concavely spherical surface section of the receptacle member preferably comprises a larger diameter than the inflow and outflow opening fashioned in the convexly spherical surface section of the retainer member. This has the advantage that a cylinder, even given a retainer member tilted relative to the receptacle member, can be actuated as long as the inflow and outflow openings of the tilted retainer member still lie in the region of the inflow and outflow openings of the receptacle member.

In any case, the means for an optional opening and closing of the fastening tool advantageously enables an actuation of the tool for fastening or releasing the part to be held, regardless of whether the retainer member happens to be movably seated on the receptacle member or happens to be fixed on the receptacle member.

Particularly given an employment of the inventive device for fastening a housing for holding an optical lens or a fiber end at an optical transmitter module, it is advantageous when an imaging optics and an optical detector are permanently arranged in the retainer member so that the imaging optics focuses light onto the detector. The light enters into this member through an opening fashioned in the surface section for applying the part of the retainer member to be held. As a result thereof, a pre-adjustment of the retainer member with respect to a light beam emitted by the module is enabled and the optical lens or fiber end in the housing can be adjusted thereto.

The imaging optics and the optical detector are preferably arranged on an axis of the retainer member proceeding through the spherical center of the convexly spherical surface section of the retainer member. In this case, the retainer member can be advantageously pre-adjusted relative to a light beam emitted by the module so that this axis of the retainer member coincides with an axis of the light beam. It is expedient to rigidly arrange the imaging optics and the optical detector in a preferably interchangeable fastening tool that is arranged coaxially relative to the axis of the retainer member and on which the housing with the lens or the fiber end is held coaxially relative to this axis.

The dimensions of the inventive device are largely arbitrary. In particular, a special advantage is to be seen wherein a radius of the surface sections of the retainer member cannot only lie in the millimeter range and below, but can also be larger than one centimeter, for example five centimeters.

An inventive device can be especially advantageously utilized for the parallel alignment of a planar surface section of the part relative to a planar surface section of another part facing toward this surface section. Thus, the one part is secured on the retainer member so that the planar surface section oft his part faces away from the retainer member and the receptacle member and wherein the planar surface section of the one part secured in this way and the planar surface of the other part are brought into planar contact with one another by moving the retainer member with the receptacle member and the other part relative to one another.

The planar surface sections of the one part secured on the retainer member and of the other part, that are brought into planar contact with one another, can be advantageously firmly joined to one another by laser welding. An optical lens and/or fiber mount can thereby be advantageously employed as the one part and an optical module, for example in the form of a laser module, to which the optical lens and/or the fiber mount is to be precisely coupled, can be employed as the other part.

Other advantages and features of the invention will be readily apparent from the following description of the preferred embodiments, the drawings and claims.

DESCRIPTION OF THE PREFERRED EMBODIMENTS

Figure 3:
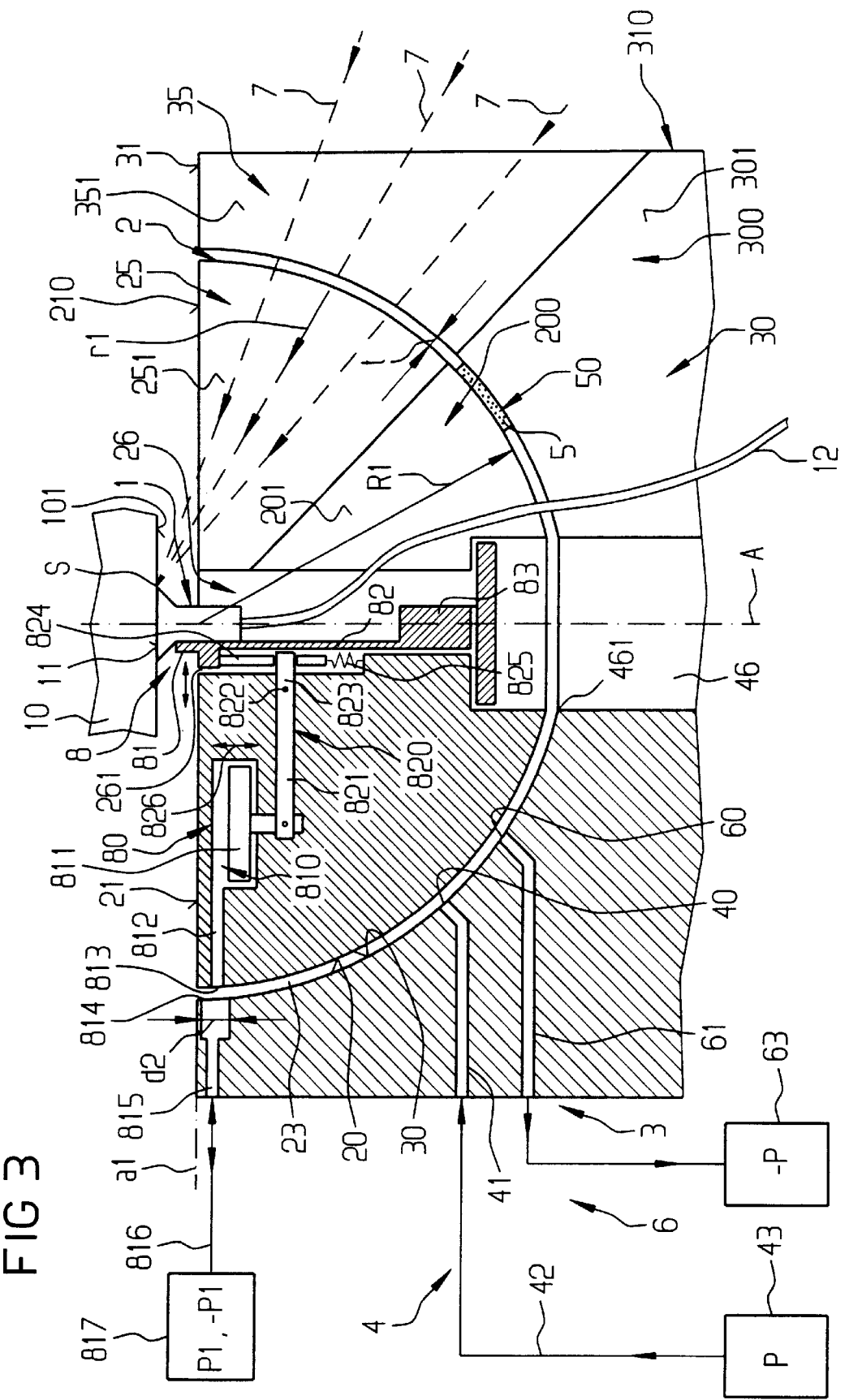
FIG. 3 is a side view with portions broken away of an exemplary embodiment wherein the retainer member is accepted in the receptacle member.

The principles of the present invention are particularly useful when incorporated in a holding device for a part, generally indicated at 1 in FIG. 3, which device has a retaining member, generally indicated at 2, which is received in a receptacle member, generally indicated at 3. The retainer member 2 has a fastening tool 8, which is interchangeably arranged on the retainer member 2 for holding the part 1.

Figure 1:
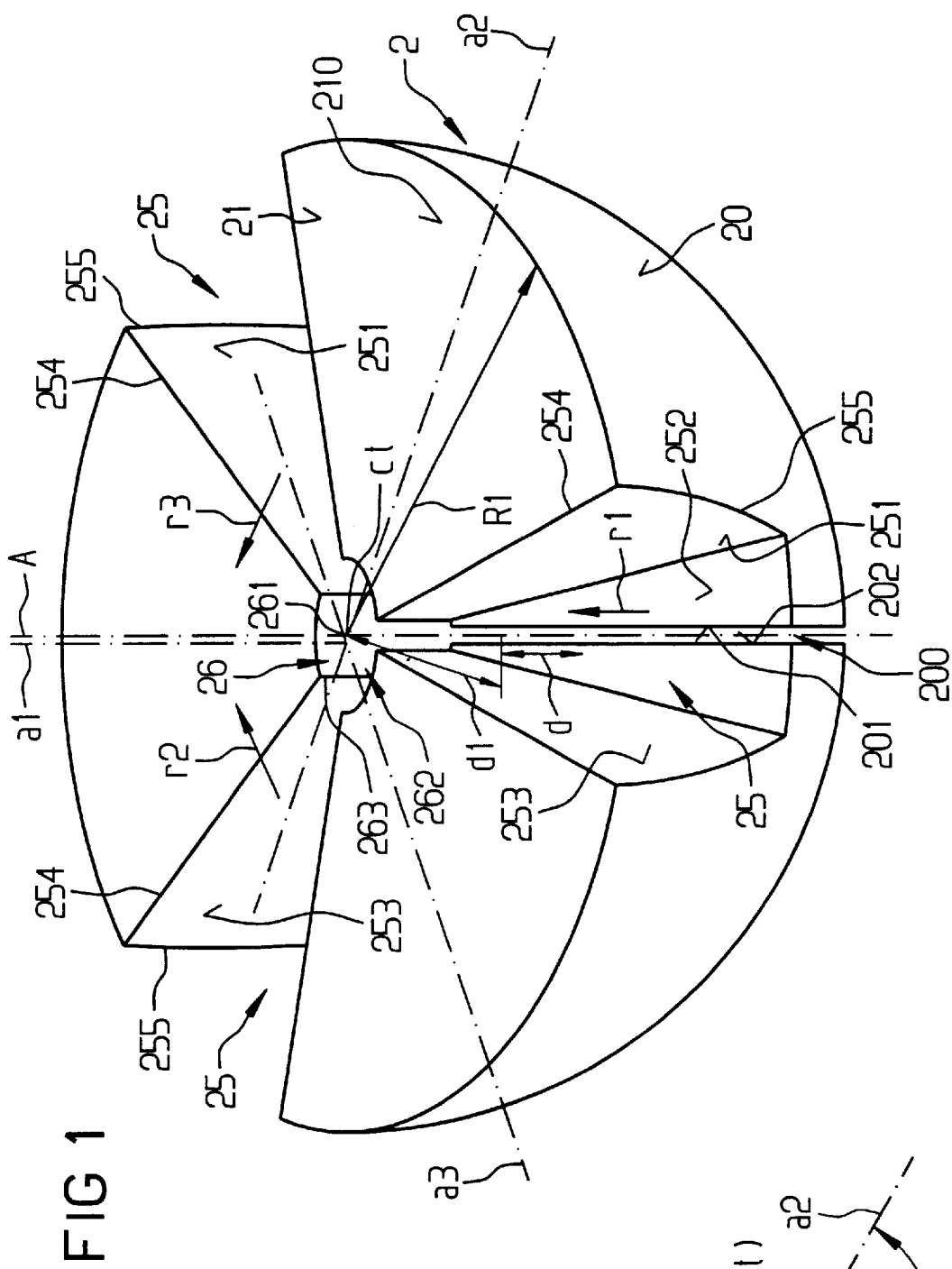
FIG. 1 is a perspective view showing the retainer member of an exemplary embodiment of the inventive device.

As best illustrated in FIG. 1, the retainer member 2 has a convexly spherical surface section 20 and a preferably planar surface section 21 facing away from the section 20 to which the part 1 to be held is to be attached.

A central axis A of this section 20 proceeds through the spherical center ct of the convexly spherical surface section 20 and proceeds vertically in the plane of FIGS. 1–5. The convexly spherical surface section 20 has a radius R1.

Figure 1A:
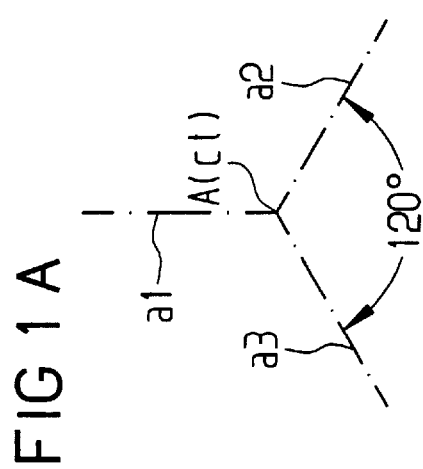
FIG. 1a is a plan view of the specific axes of the retainer member of FIG. 1 lying in a common plane.

The planar surface section 21 of the retainer member 2 is arranged, for example, so that the axis A is perpendicular to it. For example, three radial axes a1, a2 and a3, offset by an angle of 120° relative to one another, pass through the axis A and the spherical center ct in the plane of the surface section 21. These radial axes a1, a2 and a3 are shown again in FIG. 1a in a perpendicular plan view onto the planar surface section 21, so that the axis A in FIG. 1a is perpendicular to the plane of the drawing of this FIG. 1a and the radial axes a1, a2 and a3 lie in the plane of the drawing. The radial axis a1 is only apparently parallel to the axis A in FIGS. 1 and 2. In reality, it is arranged perpendicular to the axis A like the other two axes a2 and a3.

A recess or groove 25 is fashioned in the retainer member 2 under each radial axis a1, a2 and a3. This recess 25 extends in the direction of the respective radial axis a1, a2 or a3 between the convexly spherical surface sections 20 and a bore 26 of the retainer member 2, which bore is coaxial with the axis A for the acceptance of a fastening tool.

Each recess or groove 25 defines a circular sector-shaped opening 254 in the planar surface section 21, an opening 255 adjoining this opening 254 at an acute angle in the convexly spherical surface section 20, and an opening 263 in the inside wall 262 of the bore 26 of the retainer member 2. The opening 263 in the inside wall 262 of the bore 26 adjoins the opening 254 fashioned in the planar surface 21 of the retainer member 2 at an angle thereto.

Each recess 25 comprises two planar side walls 251 and 253 converging in a radial direction to the axis A and respectively arranged at the angle relative to the planar surface section 21 of the retainer member and comprises a bottom surface 252 which, likewise, is preferably planar. The bottom surface 252 connects these two side walls to one another.

The bottom surface of each recess 25, like the side walls 251 and 253, extends between the openings 255 and 263, and is arranged at an angle relative to each side wall 251 and 253. The bottom surface 252 extends in the radial direction relative to the axis A obliquely relative to the planar surface 21 so that a vertical distance d with respect to this section of the bottom surface 252 from the planar surface 21 decreases with decreasing radial distance d1 from the axis A.

As a result of the openings 254 in the planar surface section 21 of the retainer member 2 defined by the recesses or grooves 25, this surface section 21 is divided into circular sector-shaped planar sections 210 separated from one another. Each of these planar sections 210 extends in the direction of one of the radial axes a1, a2 and a3 belonging to it.

A light beam or ray 7 (see FIG. 3) propagating in the direction r1, r2 or r3 obliquely relative to the planar surface section 21 can pass unimpeded through the retainer member 2 and emerge from the planar surface section 21 through each of these recesses or grooves 25. For example, the light beam 7 can be a focused laser beam serving the purpose of a laser welding that is focused onto a point S lying in front of the planar surface section 21 of the retainer member 2, so that welding will be carried out at this point S. In the present, specific instance of the three existing recesses or grooves 25, three laser beams 7 can be simultaneously focused in directions r1, r2 and r3 obliquely relative to one another and focused onto the three points S lying in front of the planar surface section 21 of the retainer member 2 at which welding is to be respectively carried out.

Figure 2:
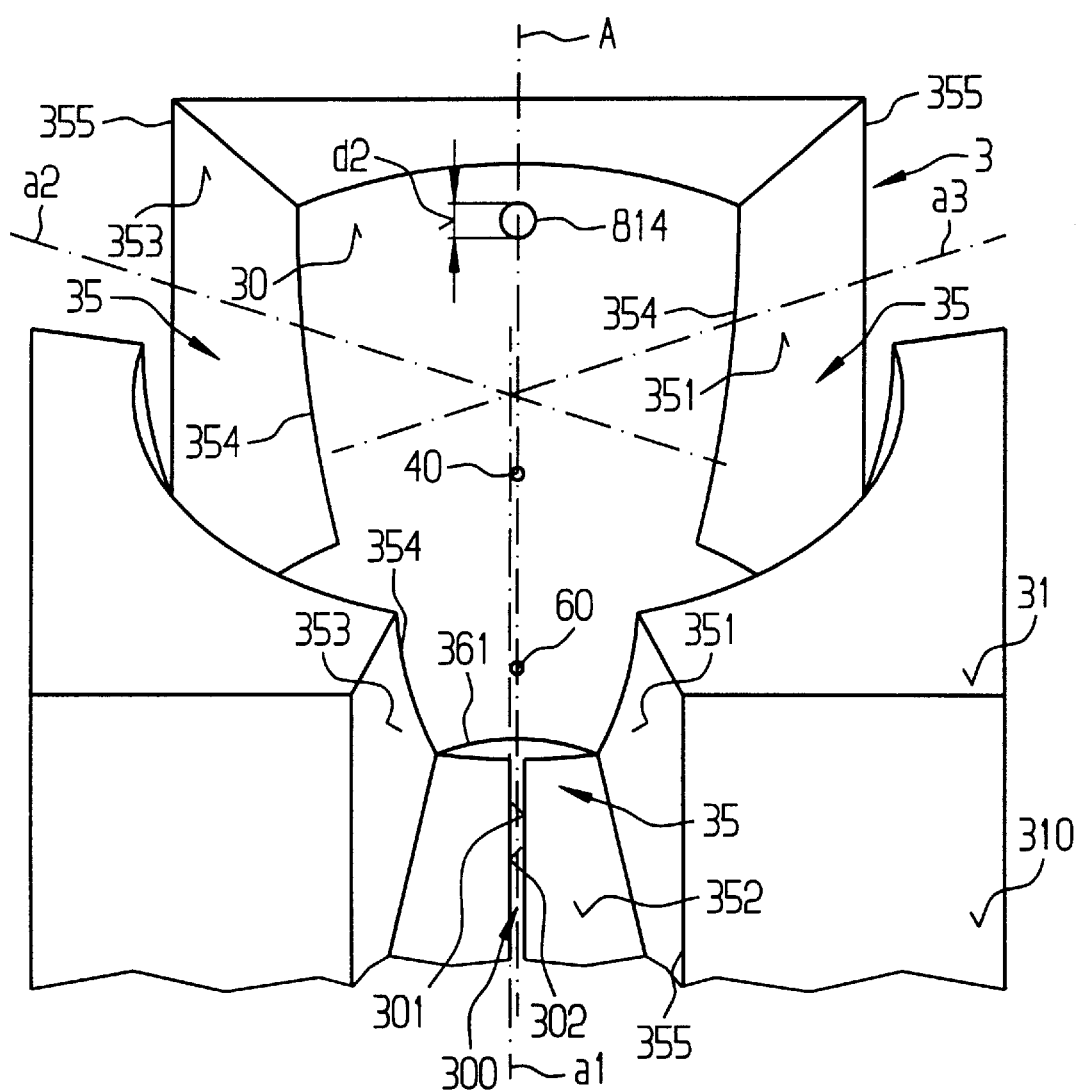
FIG. 2 is a perspective view of a receptacle member of the exemplary embodiment of FIG. 1.

The receptacle member 3 in the exemplary embodiment shown in FIG. 2 is fashioned essentially complementary relative to the retainer member 2. For example, the receptacle member 3 has a concavely spherical surface section 30 forming a glide seat surface for the convexly spherical surface section 20 of the retainer member 2.

The receptacle member 3 is arranged and shown so that the spherical center of the concavely spherical surface section 30 and a central axis of this section 30 which proceeds through the spherical center coincides with the spherical center ct and the central axis A of the convexly spherical surface section 20 of the retainer member 2.

The receptacle member 3 comprises, for example, a planar surface section 31 surrounding the concavely spherical surface section 30. This surface section 31 is parallel to the plane erected by the radial axes a1, a2 and a3 and, thus, extends perpendicular to the axis A.

In addition, a respective recess or groove 35 is fashioned in the receptacle member 3 under each of the radial axes a1, a2 and a3. These recesses or grooves 35 extend in the direction of the respective radial axis a1, a2 or a3 between the concavely spherical surface 30 and an outside surface 310 of the receptacle member 2 facing away from this section 30.

Each recess or groove 35 defines a respective opening 354 in the concavely spherical surface section 30 and a respective opening 355 in the outside surface 10. These two openings are connected to one another by side walls 351 and 353 facing toward one another and by a bottom surface 352.

Each recess or groove 35 is aligned with a respective groove or recess 25 of the retainer member 2 and is preferably fashioned so that the recess 35 is a continuation of the recess 25 in the direction of the radial axis a1, a2 or a3 of the two recesses 25 and 35 when this direction points away from the central axis A.

Each light beam 7 can propagate unimpeded both through the receptacle member 3 as well as through the retainer member 2 through the recesses or grooves 35.

FIG. 3 shows an assembled exemplary embodiment with a vertical section that is conducted in the plane erected by the central axis A and the radial axis a1, whereby the sectional surface of the section half of the retainer member 2 and the receptacle member 3 lie to the right of this plane in FIGS. 1 and 2 is shown and the axis A now lies in the plane of the drawing of FIG. 3.

A glide means 50, which is preferably a gas under pressure that is at an excessive pressure relative to the ambient pressure, is located between the concavely spherical surface section 30 of the receptacle member 3 and the convexly spherical surface section 20 of the retainer member 2 accepted in this section 30. The glide means 50 spreads between the two spherical surface sections 20 and 30 over the entire surface of the regions of these sections 20 and 30 lying opposite one another and forms a glide layer 5 of which only a fraction is shown in FIG. 3. As a result of this glide layer, the retainer member 2 is seated practically friction-free on the receptacle member 3.

The distance t between the two spherical surface sections 20 and 30 that defines the thickness of the gaseous glide layer 5 preferably lies in the micrometer range and, for example, can amount to 10 micrometers.

The gaseous glide layer 5 can be temporarily produced by a means 4. The means 4 comprises an inflow opening 40 fashioned in a concavely spherical surface section 30 to allow the gas 50 to flow in under a pressure P into the interspace 23 between the two spherical surface sections 20 and 30. The means 4 comprises an optionally actuatable means 43 connected to the inflow opening 40 for producing the gas 50 under the pressure P. The means 43 is connected by a channel 41 fashioned in the receptacle member 2 and leading to the inflow opening 40 and a pressure conduit 42 connecting the channel 41 to this means 43.

As a result of a means 6, an under-pressure −P can be generated between the two spherical surface sections 20 and 30 for pressing these two surface sections 20 and 30 against one another and for fixing the retainer member 2 and receptacle member 3 relative to one another. The means 6 comprises an extraction opening 60 fashioned in the concavely spherical surface section 30 for extracting the gas 50 in the interspace 23 between the two spherical sections 20 and 30. An optionally actuatable means 63 is provided for generating the under-pressure −P that is connected to the extraction opening 60. The means 63 is connected by a channel 61 fashioned in the receptacle member 3 and leading to an extraction opening 60 and an under-pressure or suction conduit 62 connecting the channel 61 to this means 63.

The means 4 and the means 6 can be actuated independently of one another and, in particular, in alternation.

A fastening tool 8 for optional releasable fastening of the part 1 to be held on the retainer member 2 is secured on the retainer member 2. The tool 8 is replaceably arranged in the central bore 26 of the retainer member 2. For example, the fastening tool 8 is composed of a collet chuck that, in the condition of being installed in the retainer member 2, comprises clamp jaws 81 grouped around the central axis A and radially adjustable relative to this axis A, between which, for example, the cylindrical part 1 can be held with its cylindrical axis coaxial to the axis A.

For example, the collet chuck 8 comprises three clamp jaws 81, each of which is firmly connected by an oblong, individual spring 82 extending along the axis A to a solid base 83 that is shared by all springs 82. In FIG. 3, this collet chuck 8 is shown partially and in section as well as built into the retainer member 2, whereas the collet chuck 8 is shown uninstalled and in a perspective view in FIG. 4.

In FIG. 3, for example, the built-in collet chuck 8 holds a part 1 in the form of a cylindrical housing for holding the end of a fiber 12. This held housing 1 comprises a planar end face 11 facing away from the planar surface section 21 of the retainer member 2. This end face 11 is arranged and aligned plane-parallel relative to a planar surface section 101 of another part 10, for example a laser module, that faces toward this end face 11. This alignment occurs, for example, automatically where the end face 11 is brought into contact with the rigidly arranged planar surface section 101 under a slight pressure and the retainer member 2 being air seated in the receptacle member 3. As a result of a following fixing of the retainer member 2 relative to the receptacle member 3, this alignment can be securely retained, for example for a multi-point laser welding wherein the parts 1 and 10 are firmly joined to one another.

A respective slot 200 or 300 for accepting the optical fiber 12 it formed in the retainer member 2 and receptacle member 3. According to FIGS. 1–3, the slots 200 and 300 extend along the radial axis a1 in the recess 25 or 35 located thereunder in the retainer member 2 and the receptacle member 3. The slots extend following one another from the outside surface 310 over the spherical surface sections 30 and 20 up to the central bore 26. The slot 300 is limited by planar side walls 301 and 302 facing toward one another, and the slot 200 is limited by planar side walls 201 and 202 facing toward one another. Each of the side walls 201, 202, 301 and 302 is parallel to a plane formed by the axis A in the radial axis a1.

A means 80 for optionally opening and closing the collet chuck 8 is fashioned on the inside of the retainer member 2. This means includes a pneumatic cylinder 810 per clamp jaw 81 and a force transmission means 820 for transmitting a force of a piston 811 in the cylinder 810 onto the clamp jaw 81 for moving this clamp jaw 81 in the direction of a closing or opening of the collet chuck 8, as desired.

Each pneumatic cylinder 810 is preferably connected to an inflow and an outflow opening 813 formed in the convexly spherical surface section 20 of the retainer member 2, and this connection is made by a channel 812 fashioned in the retainer member 2. An inflow and outflow opening 814 is arranged in the concavely spherical surface 30 of the receptacle member 3 opposite the inflow and outflow opening 813. The inflow and outflow opening 814 is connected to a means 817 for optionally generating a pressure P1 and an under-pressure –P1, which means 817 is arranged preferably outside the retainer member 2 and the receptacle member 3. The connection to the means 817 is preferably by a channel 815 formed in the receptacle member 3 and leading to the inflow and outflow opening 814 and by a pressure and under-pressure conduit 816 connecting this channel 815 to the means 817.

The inflow and outflow opening 814 is fashioned with a diameter d2 in the concavely spherical surface section 30 of the receptacle member 3, which diameter d2 is preferably larger than the diameter of the inflow and outflow opening 813 fashioned in the convexly spherical surface section 20 of the retainer member 2. This has the advantage that the cylinder 810 can also be actuated given a retainer member 2 that is tilted relative to the receptacle member 3, as long as the inflow and outflow opening 813 of the tilted retainer member 2 still lies in the region and in communication with the inflow and outflow opening 814 of the receptacle member 3.

The force transmission means 820 comprises a respective rotary lever 821 per clamp jaw 81 and is connected to the piston 811. The lever 821 is rotatable about a rotational axis 822 perpendicular to the axis A and the respective radial axis a1, a2 or a3. The means 820 has a lever section 823 located between the jaw 81 and this rotary axis 822, and the section 823 actuates the clamp jaw 81 via, for example, an intermediate link 824. On the side of the lever section 823 facing away from the clamp jaw 81, a spring 825 firmly supported on a retainer member 2 presses against the section 823 and, thus, against the clamp jaw 81. When the piston 811 is moved upward in the direction of the double arrow 826, for example by generating an under-pressure –P1 in the cylinder 810, the spring 825 is compressed and the clamp jaw 81 is relieved, so that it opens. When the under-pressure is removed, the spring 825 again presses onto the clamp jaw 81 and closes it via the lever section 823 and the intermediate link 824.

The means 80 for optionally opening and closing the collet chuck 8 enables an actuation of the clamp jaws 81 from the outside, regardless of whether the retainer member 2 happens to be movably seated on the retainer member 3 or is in a fixed position.

Figure 4:
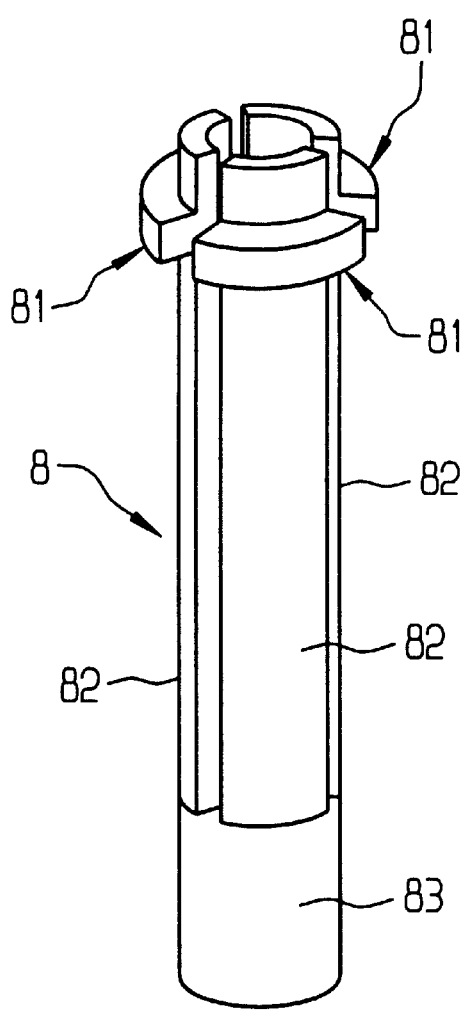
FIG. 4 is a perspective view of a fastening tool of the exemplary embodiment for holding a part.
Figure 5:
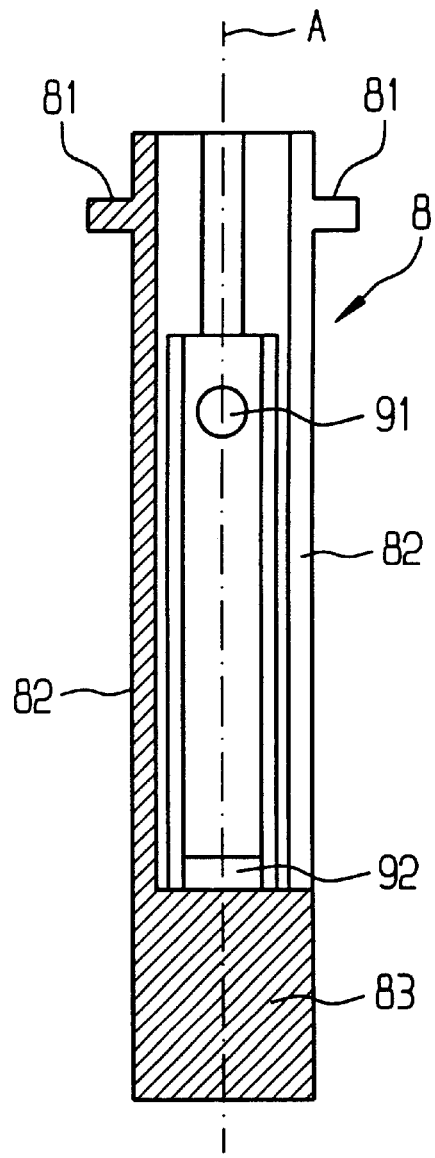
FIG. 5 is a partial cross sectional view along an axis A through the fastening tool of the exemplary embodiment that contains an imaging optics and an optical detector.

A collet chuck 8 illustrated in FIG. 5 in the longitudinal section differs from the chuck 8 according to FIG. 4 essentially only in that it has an imaging optics 91 and an optical detector 92 arranged so that the imaging optics 91 focuses light that propagates along the axis A onto the detector 92. The imaging optics 91 and the optical detector 92 are rigidly arranged relative to the retainer member 2 as soon as the collet chuck 8 is rigidly built into the member 2.

Although various minor modifications may be suggested by those versed in the art, it should be understood that we wish to embody within the scope of the patent granted hereon all such modifications as reasonably and properly come within the scope of our contribution to the art.

We claim:

1. A device for holding a part comprising a retainer member provided with an attaching and holding part, said retainer member having a convexly spherical surface section and a surface section for applying the part to be held, and a receptacle member provided for a rotatable bearing for the retainer member, said receptacle member having a concavely spherical surface section forming a glide seat surface for receiving the convexly spherical surface section of the retainer member, the improvements comprising glide means for reducing the friction between the spherical surface sections of the retainer member and the receptacle member, said glide means temporarily producing a gas glide layer between the spherical surface sections and said glide means temporarily producing an under-pressure between the spherical surface sections having at least one extraction opening fashioned in at least one of the two spherical surface sections for extracting the gas from the interspace between the two spherical surface sections.

2. A device according to claim 1, wherein the glide means for generating the gas glide layer includes at least one inflow opening fashioned in one of the two spherical surface sections for allowing a gas to flow in under pressure and to the interspace between the two spherical surface sections.

3. A device according to claim 2, wherein the glide means for producing the glide layer of gas comprises an optionally actuatable means for generating the gas under a pressure that is connected to the inflow opening.

4. A device according to claim 1, wherein recesses are fashioned in the retainer member and the receptacle member, said recesses allowing at least two light rays directed onto the convexly spherical surface sections in directions oblique relative to one another to pass unimpeded through the receptacle and retainer members and from the surface section for applying the part to be held.

5. A device according to claim 1, wherein a fastening tool for optionally releasably fastening a part to be held on the retainer member is secured on the retainer member.

6. A device according to claim 5, which includes means for optionally opening and closing the fastening tool.

7. A device according to claim 6, wherein the means for optionally opening and closing the fastening tool is fashioned in the retainer member and is externally actuatable.

8. A device according to claim 1, which includes imaging optics and an optical detector being rigidly arranged in the retainer member, said imaging optics focusing light that enters through an opening fashioned in a surface section of the retainer member onto the detector.

9. A device according to claim 8, wherein the imaging optics and the optical detector are arranged in a fastening tool.

10. A device according to claim 1, wherein a slot for the acceptance of an optical fiber is provided in the retainer member.

11. A device according to claim 1, wherein the radius of the surface section of the retainer member is larger than one centimeter.

12. A device according to claim 1, wherein the glide means comprises an optionally actuatable means for producing the under-pressure that is connected to the extraction opening.

13. A method of arranging parallel alignment of planar surface sections of a part relative to a planar surface section of a second part comprising the steps of providing a device having a retainer member and a receptacle member, the retainer member having a convexly spherical surface section and a surface section for supporting a part to be held, the receptacle member being provided with a rotatable bearing for the retainer member and comprising a concavely spherical surface section forming a glide seat surface for the convexly spherical surface section of the retainer member, glide means being arranged between the spherical surface sections for creating a glide layer to reduce the friction between the spherical surface sections; securing one part on the retainer member with the planar surface of this part facing away from the retainer member and the receptacle member; bringing the planar surface of the one part secured to the retainer member into contact with a planar surface section of a second part by moving the retainer member and the receptacle member and the other part relative to one another while the glide means reduces the friction between the retainer member and the receptacle member; and, after bringing the planar surfaces of the one part and the other part into contact with one another, reducing the glide layer to increase the friction between the retainer member and the receptacle member to hold these members in their position.

14. A method according to claim 13, which further includes joining the planar surface section of the one part to the other part after being brought into contact with one another by laser welding.

15. A method according to claim 13, wherein the one part is selected from an optical lens and an optical fiber and the other part is an optical transmitter module to be connected to the one part.

* * * * *